United States Patent [19]

Sakata

[11] Patent Number: 4,882,603
[45] Date of Patent: Nov. 21, 1989

[54] ORIGINAL DOCUMENT COVER DEVICE
[75] Inventor: Toshio Sakata, Osaka, Japan
[73] Assignee: Minolta Camera Kabushiki Kaisha, Osaka, Japan
[21] Appl. No.: 190,675
[22] Filed: May 5, 1988
[30] Foreign Application Priority Data
   May 14, 1987 [JP] Japan .............................. 62-72024[U]
[51] Int. Cl.$^4$ .............................................. G03B 27/62
[52] U.S. Cl. .................................................... 355/75
[58] Field of Search ........................ 355/73, 72, 75, 76
[56] References Cited
   FOREIGN PATENT DOCUMENTS
   59-141341 9/1984 Japan .
   60-28756 2/1985 Japan .

Primary Examiner—Richard A. Wintercorn
Attorney, Agent, or Firm—Wenderoth, Lind & Ponack

[57] ABSTRACT

An original document cover device having a document cover which can be opened and closed in relation to an original document platen, a pressing member which is movable between an operating position in the document placement region of the document platen and non-operating position outside said document placement region, a support member which is rotatably mounted at one end to the edge of the said document cover and mounted at the other end to said pressing member so as to support said pressing member, said pressing member moving from the operating position to the non-operating position on the original document platen in accordance with the closing action of said document cover.

6 Claims, 3 Drawing Sheets

ORIGINAL DOCUMENT COVER DEVICE

FIELD OF THE INVENTION

The present invention relates to an original document cover device for use in copying machines and the like.

BACKGROUND OF THE INVENTION

The present type of device conventionally provides only an original document cover C which can be opened and closed so as to hold down an original document B disposed upon an original document platen A when in the closed position covering said document platen A, as shown in FIG. 1.

Furthermore, when original document B is a diagram which exceeds the JIS A2-size paper it often bears a distinct crease on the corner or edge of the interior face, or it possesses a distinct curl due to being lightly rolled into a cylindrical shape for storage.

When original documents of these types are copied, the original document B is lifted up at the fold, curl or the like at an imaginary line as shown in FIG. 5 even if held down by the aforesaid document cover C. Further, when said document cover C is simply pressed, a backward warp is induced toward the inside of the document without spreading flat and pinning the aforesaid fold or curl, thereby damaging the original image while imparting a fold thereto.

Thus, two persons must act cooperatively so that one person presses down the lifted portion of document B with his hands, while another person closes document cover C.

When a separate document cover D is used in addition to document cover C, said cover D must first be pressed on the portion of document B to be copied, as shown in the drawing, then document cover C is closed on said cover D and the copying operation is performed. However, this operation requires additional components and complicates the entire process.

It is known that devices eliminating these disadvantages are disclosed in Japanese Pat. Nos. Sho 59-141341 and Sho 6028756. These devices are provided with a notch in a portion of the elastic member which forms the surface of the original document cover, and have a rotatable document pressing member disposed in said notch so as to have the document pressing member clamp down on the original document disposed on the document platen when the document cover is closed. Thus, even original documents which are bent backward due to permanent creases or curls can be pressed to the document platen by simply closing the document cover.

However, the document pressing member remains positioned behind the original document even after the completion of the pressing action, because the aforesaid document pressing member stays in the pressing attitude after the document cover is closed. Therefore, when a thin sheet or transparency such as tracing paper is used, an image or shadow formed by the notch on the elastic member of the document cover, document pressing member and its support member may appear in the copy image.

Furthermore, because the document pressing member can only be provided to a limited portion of the document cover surface, it can only press a limited portion of the original document disposed upon the document platen. Therefore, said device is inadequate and ineffective on the edges of original documents which are easily folded backward.

SUMMARY OF THE INVENTION

An object of the present invention is to provide a document cover device which can be used to automatically spread original documents including creased and curled documents by simply closing said document cover to apply pressure to the document platen, and which does not influence the copy image even when transparent and semi-transparent original documents are used.

The present invention accomplishes the aforesaid objects by providing a document cover device having a document cover which can be opened and closed in relation to an original document platen, the document cover device being characterized by a pressing member which is moveable between an operating position in a document placement region of the document platen and a non-operating position outside the document placement region, a support member which is rotatably mounted at one end to the edge of the aforesaid document cover and mounted at the other end to said pressing member so as to support said pressing member, said pressing member moving from the non-operating position to the operating position on the original document platen in accordance with the closing action of said document cover.

The above and other objects, features and advantages of the present invention will become more apparent from the following description when taken in conjunction with the accompanying drawings in which the preferred embodiments of the invention are shown by way of illustrative example.

BRIEF DESCRIPTION OF THE DRAWINGS

In the following description, like parts are designated by like reference numbers throughout the several drawings.

DESCRIPTION OF THE PREFERRED EMBODIMENT

A single embodiment of the present invention will be described hereinafter with reference to FIGS. 2 to 5. The present embodiment is shown in a document cover device installed in a copy machine.

Figure 1:
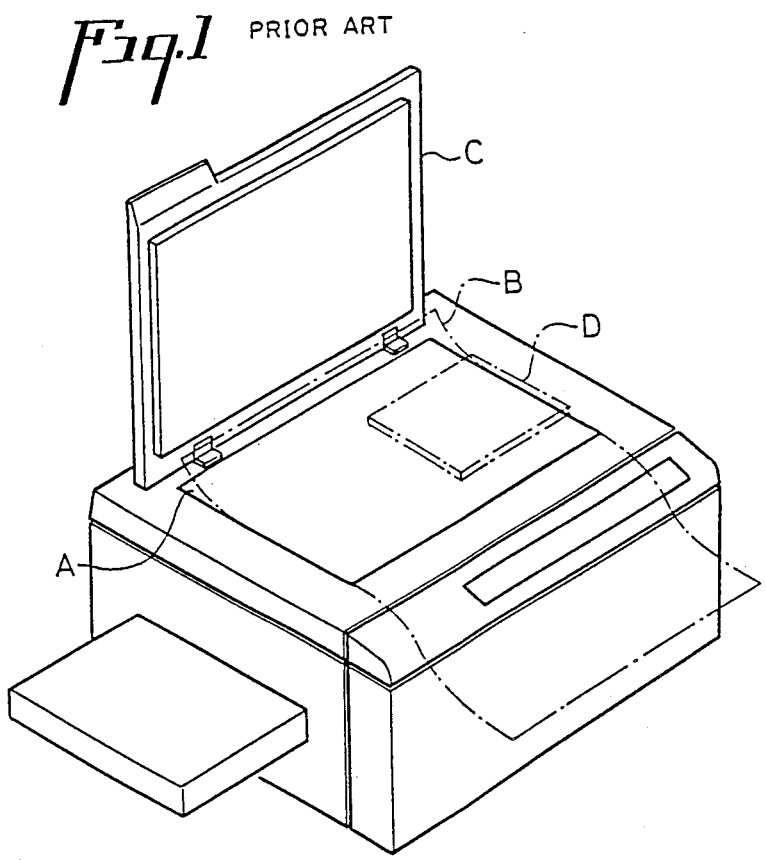
FIG. 1 is a perspective view of a conventional copy machine.
Figure 2:
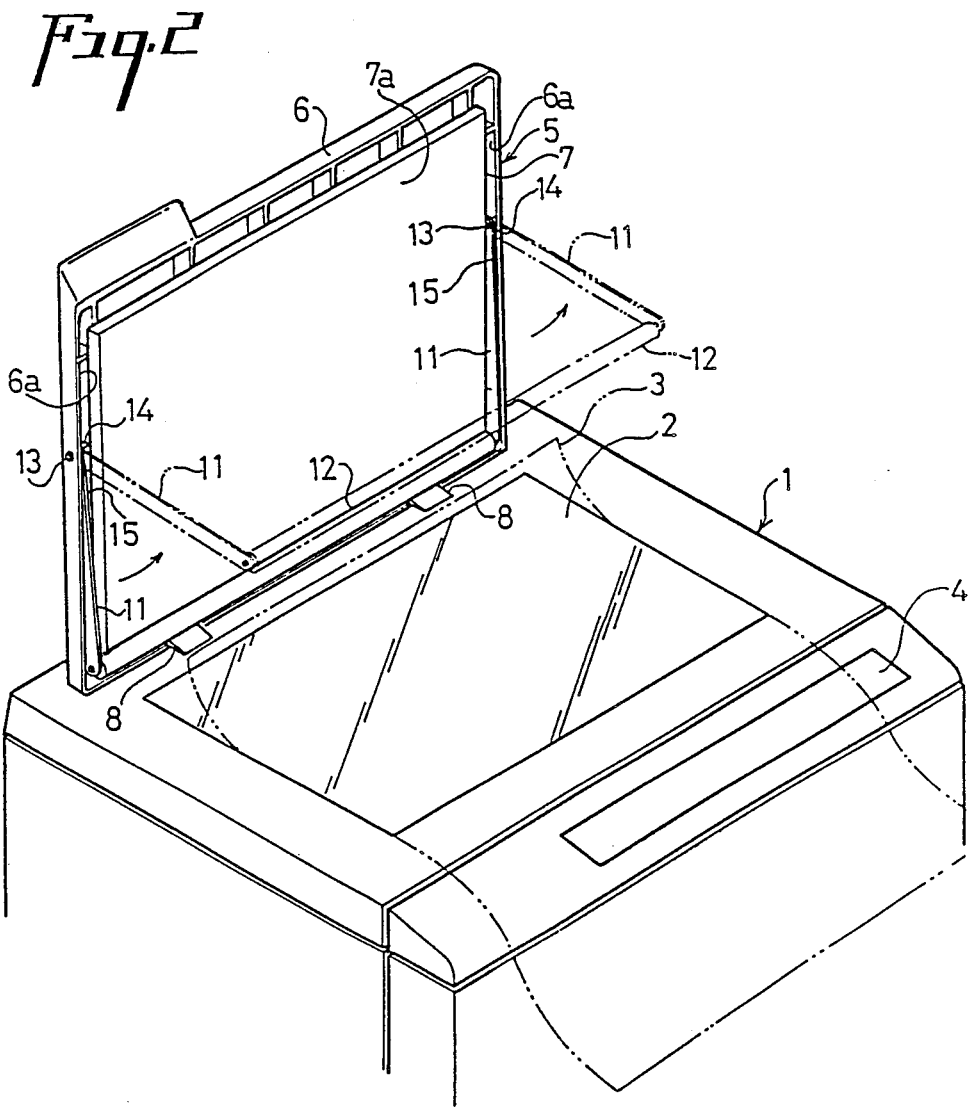
FIG. 2 is a perspective view of a copy machine incorporating a single embodiment of the present invention.

An original document glass platen 2 is provided at the top and substantially to the center of a copy machine body 1 shown in FIG. 2, and has an original document 3 disposed thereon for copying. Operator control panel 4 for controlling the copying process is provided in the portion anterior to the document glass platen 2 on copy machine body 1, and a document cover 5 which presses said original document 3 on the document glass platen 2 and is disposed posteriorly thereto.

The document cover 5 has an elastic pressure panel 7 mounted on the inside of a resin document cover 6 and which forms a document cover surface 7a that corresponds to the copy region. The document cover 5 is connected to the top surface of copy machine body 1 by means of hinges provided at the bottom edge of the document cover 6, and closes from that side so as to press upon the original document 3 disposed on the document glass platen 2, and opens toward the hinged side from the closed position thereby releasing the original document 3.

The document cover 5 has provided thereon moveable support arms 11 at both sides of the document cover surface 7a and which are moveable between an extended position (shown in FIG. 2 as imaginary lines) and a retracted position (shown in FIG. 2 as solid lines) from both sides of the document cover surface 7a, the free ends of the support arms 11 providing a support axis for pressing roller 12 interposed therebetween. When the document cover 5 is closed while the support arms 11 are in the aforesaid extended position, the pressing roller 12 comes into contact with the document placement region of document glass platen 2 and travels on said document glass platen 2 away from the document placement region as the pressing roller 12 rotates toward the retracted position of the support arms 11 in accordance with the closing action of said document cover 5.

Figure 3:
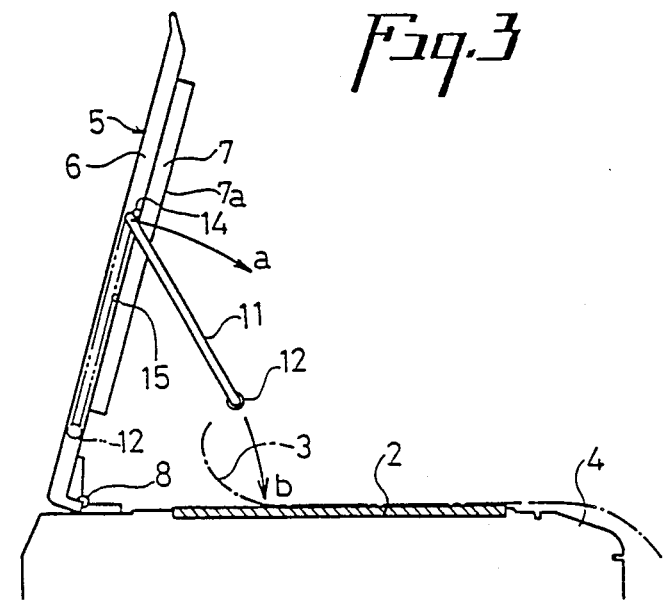
FIGS. 3, 4 and 5 are side elevation views showing operating conditions when the pressing roller is engaged.
Figure 4:
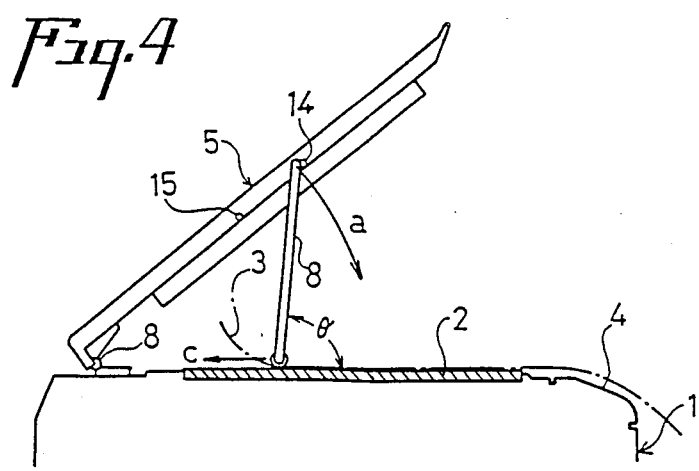

Thus, the support arms 11 are rotatable and pivot on axles 13 at one end at side wall 6a of the document cover 6, and are controlled by means of a stopper 14 at the extended position from document cover surface 7a as described by the imaginary lines in FIG. 2 and at the control positions described in FIGS. 3 and 4; when said support arms 11 are in the aforesaid extended position, said support arms 11 always have a force applied thereto in the direction of the control position by a spring (not shown in the drawings).

The inside of side wall 6a of the document cover 6 has provided thereon click stoppers 15 which opposes the force applied to the support arms 11 in the direction of the control position when the support arms 11 are in the retracted position, thereby elastically stopping said arms at the retracted position in such a way that said support arms 11 cannot move to the extended position without being manually removed from said click stoppers 15.

Accordingly, as long as the support arms 11 are not manually extended from the retracted position, the support arms 11 and the pressing roller 12 supported thereby remain housed in the retracted position removed from the document cover surface 7a, as shown by the solid lines in FIG. 2, and thus have no effect whatsoever on the normal use of the document cover 5.

The pressing roller 12 can be used when the original document 3 is a diagram or the like that has been rolled into a cylinder so as to induce a definite curl toward the inside. When pressing roller 12 is used, first the document cover 5 is opened as shown in FIG. 2, and the support arms 11 are extended from the retracted position after removal from the click stoppers 15. Thus, the support arms 11 and the pressing roller 12 are freed, and automatically extended to the extended position shown in FIG. 3 and described by the imaginary lines in FIG. 2 via the force applied by the spring.

In this state, when the document cover 5 is closed upon the original document glass platen 2 in the direction of the arrow "a" as shown in FIG. 3, the pressing roller 12 travels in the direction of the arrow "b," making contact with the top of the original document glass platen 2 and moving over the original document 3 disposed thereon. The position of disposition for the pressing roller 12 is substantially central to the original document placement region on the document glass platen 2, and since this region of the original document 3 closely conforms to the surface of document glass platen 2 even when the original document is distinctly curled, no folds or wrinkles are imparted to said original document.

When the document cover 5 is closed in the direction of the arrow "a" from the position shown in FIG. 4, the pressing roller 12 which is in direct contact with the the top of the document glass platen 2 cannot be lowered further and rolls in the direction of arrow "c" guided by the document glass platen 2, thereby rotating the support arms 11 to the retracted position. An angle $\theta$, and more specifically the angle $\theta$ formed by the support arms and the document glass platen when the pressing roller is in contact with said document glass platen, such that $90° < \theta$ is desirable to assure that the rolling action of said pressing roller 12 in the direction of arrow "c" in conjunction with the rotation of support arms 11 is smoothly accomplished. The pressing roller 12 presses the original document 3, which is raised due to the curling described previously, to the top of the document glass platen 2 as it travels via said rolling action, thereby spreading the original document 3. The pressing roller 12 is disconnected from the document placement region of glass platen 2 and the document cover surface 7a immediately before the document cover 5 closes.

Figure 5:
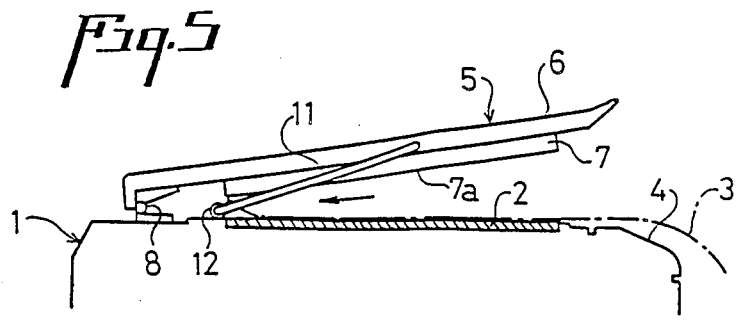

Thus, although the curl of original document 3 tends to rise again when the pressing roller 12 separates from the top of the original document 3 as shown in FIG. 5, such a rise of original document 3 is prevented as is a backward warp toward the inside of the original document 3 because the aforesaid document cover 5 has achieved a near proximity to the top of document glass platen 2 as shown in FIG. 5. Thereafter the document cover 5 completely spreads pen the original document 3 by closing completely on the document glass platen 2, thereby applying pressure to said glass platen 2.

Furthermore, the complete return of said pressing roller 12 and support arms 11 to the retracted position may also be accomplished by manual operation. When the document cover 5 is in the state of applying pressure on the original document, the pressing roller 12 and support arms 11 may be automatically retracted when they are pushed back by means of the contact between the components and the upper surface of the copy machine body.

The present invention, by means of the aforesaid construction and operation, automatically spreads completely open an original document, and further spreads open even a distinctly curled original, by using a pressing member which moves only in conjunction with the closing of a document cover to apply pressure to the document tray to provide copies and the like, and the pressing member and support members manifest no image or shadow effects whatsoever on the copy image even in the case of transparent or semi-transparent original documents because the components are removed from the document placement region of the of the document tray when in the aforesaid state of applying pressure.

Although the present invention has been fully described by way of example with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. In an original document cover device for use in a copying apparatus which comprises:
   (1) an original document platen defining a document placement region for placing an original document thereon, said document placement region having a perimenter;
   (2) an original document cover which is to be opened and closed in relation to the document placement region of said original document platen;
   (3) a pressing member rotatably movable over the original document against said original document platen for pressing the original document against said original document platen;
   (4) a support member which is pivotably mounted on said original document cover and supporting said pressing member so as to move said pressing member from said document placement region to a region outside said perimeter of said document placement region during closing of said original document cover.

2. An original document cover device as claimed in claim 1, wherein the pressing member is a roller which presses said original document against said original document platen.

3. An original document cover device as claimed in claim 1, wherein said pressing member is rotatably supported by said support member so as to move said pressing member from said document placement region to outside said perimeter of said document placement region during closing of said original document cover.

4. An original document cover device as claimed in claim 1, wherein said support member is urged by said original document cover so as to press the original document against said original document platen.

5. In an original document cover device for use in a copying apparatus, which comprises:
   (1) an original document platen defining a document placement region for placing an original document thereon, said document placement region having a perimeter;
   (2) an original document cover which is to be opened and closed in relation to the document placement region of said original document platen;
   (3) a pressing member rotatable over said original document platen to press the original document against said original document platen;
   (4) a support member pivotably mounted at one end to said original document cover and supporting said pressing member with the other end so as to move said pressing member from said document placement region to outside said perimeter of said document placement region during closing of said original document cover.

6. An original document cover device as claimed in claim 5, wherein said one end of said support member is mounted to said original document cover at a location outside said perimeter of said document placement region when said original document cover is closed.

* * * * *